United States Patent [19]

Waters

[11] Patent Number: 4,960,257

[45] Date of Patent: Oct. 2, 1990

[54] EASEL

[76] Inventor: Daniel F. Waters, 1220 Amberglen, St. Peters, Mo. 63376

[21] Appl. No.: 345,489

[22] Filed: May 1, 1989

[51] Int. Cl.⁵ ............................................. B41J 11/02
[52] U.S. Cl. ................................. 248/442.2; 248/454; 248/918
[58] Field of Search ................. 248/1 B, 441.1, 442.2, 248/447.2, 205.3, 454; 312/7.2, 233; 400/718

[56] References Cited

U.S. PATENT DOCUMENTS

| | | | |
|---|---|---|---|
| 1,221,369 | 4/1917 | Osborne . | |
| 2,286,048 | 6/1942 | Bahr | 120/28 |
| 2,306,659 | 12/1942 | Wise | 197/3 |
| 2,783,015 | 2/1957 | Kampa | 248/485 X |
| 3,918,668 | 11/1975 | Thorpe | 248/205.3 |
| 4,033,652 | 7/1977 | O'Brien | 312/233 X |
| 4,197,026 | 4/1980 | Yorbach et al. | 400/718 |
| 4,243,335 | 1/1981 | Singley | 400/718 |
| 4,313,112 | 1/1982 | Foster | 340/700 |
| 4,332,364 | 6/1982 | Beskin | 248/442.2 |
| 4,475,705 | 10/1984 | Henneberg et al. | 248/447.2 |
| 4,496,200 | 1/1985 | Hagstrom et al. | 312/208 |
| 4,546,947 | 10/1985 | Gesten | 248/442.2 |
| 4,582,285 | 4/1986 | Bello | 248/442.2 |
| 4,619,429 | 10/1986 | Mazza | 248/442.2 X |
| 4,632,471 | 12/1986 | Visnapuu | 312/7.2 X |
| 4,652,013 | 3/1987 | Azzato | 281/46 |
| 4,693,443 | 9/1987 | Drain | 248/1 B X |
| 4,747,572 | 5/1988 | Weber | 248/442.2 |
| 4,767,093 | 8/1988 | Jones | 248/442.2 |

FOREIGN PATENT DOCUMENTS 371611 3/1923 Fed. Rep. of Germany .
523150 7/1940 United Kingdom ............. 248/442.2

Primary Examiner—J. Franklin Foss

[57] ABSTRACT

An improved document easel preferably for use with video display terminals, has a generally L-shaped bracket and a generally U-shaped member removably attached to the video display terminal. The generally L-shaped bracket is rotationally connected to a base member of a generally U-shaped bracket such that the U and L shaped brackets rotate with respect to each other about an axis of rotation that is generally perpendicular to the U-shaped bracket base member. A pair of arm members extend out from the U-shaped member and are attached to a document easel so as to provide rotational movement between the U-shaped member and the easel about an axis of rotation that is generally parallel to the base member of the U-shaped member. A hollow tube and rod combination provide a selectively adjustable tension/compression arrangement, thereby allowing reorientation of the easel relative to the video display terminal.

40 Claims, 2 Drawing Sheets

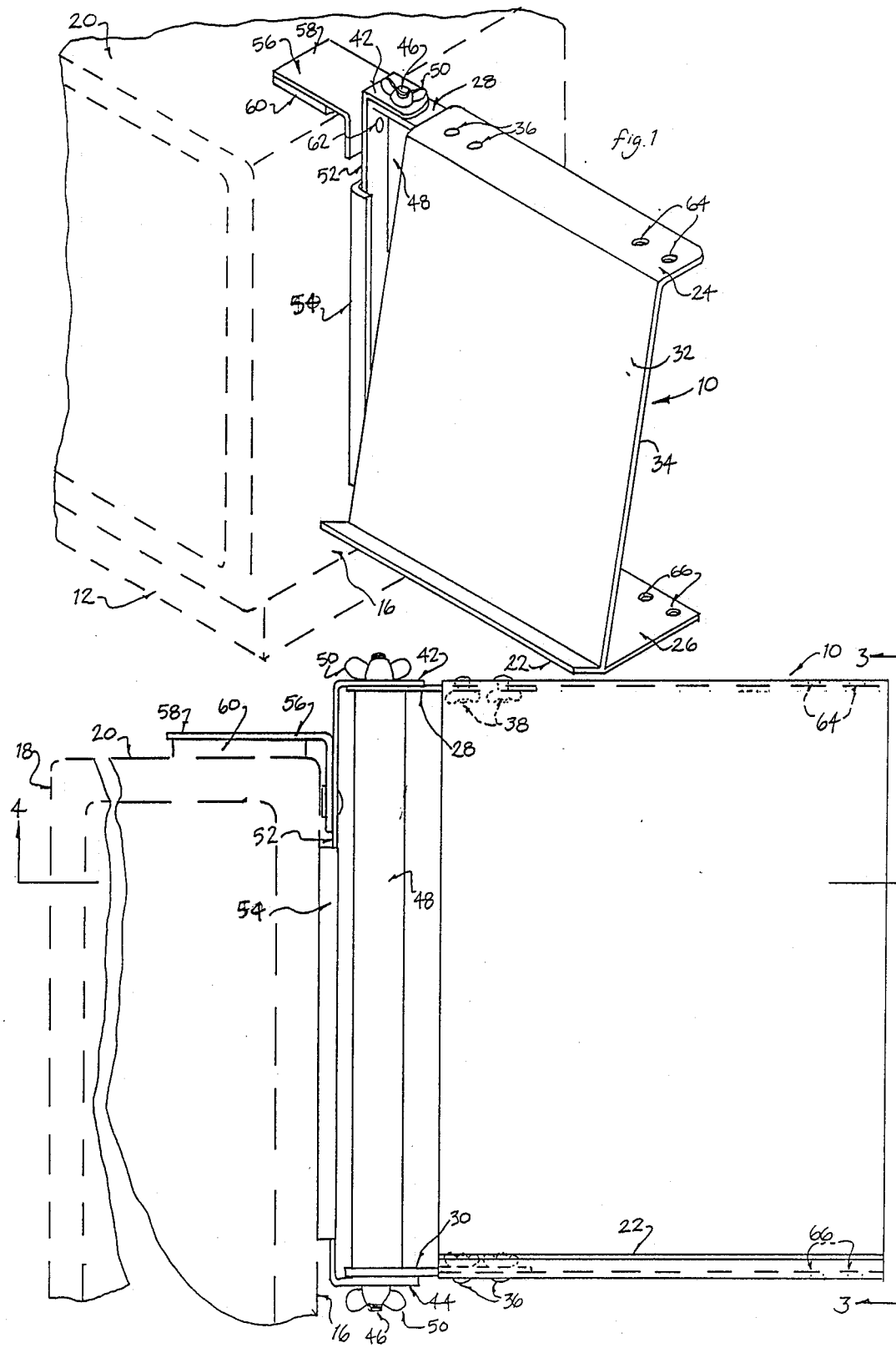

EASEL

BACKGROUND OF THE INVENTION

The present invention relates in general to easels for supporting books, documents, notes, drafts and the like and pertains, more particularly, to an easel for aiding the operator of a video display terminal by supporting the book, document, note, draft or the like at an easy to read angle while the easel is attached to the video display terminal and further allowing the easel to be selectively reoriented.

Very often documents, notes and the like to be used or referred to by a computer operator are not adjacent to the monitor or video display terminal where it would be most useful for the operator. Operator fatigue and reduced production and output can be traced to the operator continually refocusing from screen to paper and back again in order to read the pertinent document. With a conventional easel it is generally necessary to provide a relatively complex attachment method for attachment of the easel to the work device, for example, the video display terminal (hereinafter "VDT"). Typically, the attachment method requires an undesirable permanent attachment of the easel to the VDT. It will be understood that the present invention is not limited to use on a VDT, however, the VDT device provides a clear example of how the present invention operates. Conventional easels have another drawback since use is limited to a particular style or model because the VDT will have been constructed or adapted in a specific manner to specifically work with a particular easel.

Another important drawback to conventional easels is the overly difficult methods typically used to reorient the easel. Conventional easels are often structurally insufficient to support more than a few documents at a time, support even one bulky or heavy document, book or the like, or support their own weight.

Accordingly one object of the present invention is to provide an improved document easel that provides an elegant attachment method. The component member shapes of the present invention lend themselves to a simple attachment of the easel to a VDT or similar device in a manner that does not require permanent attachment of the easel so that the easel can be moved from one side of the VDT to the other or to another VDT.

Another object of the present invention is to provide an improved document easel that is not limited in its use to a particular equipment style or model. The equipment on which the easel of the present invention can be used generally is not limited due at least in part to the flexibility of the preferred material suggested herein for manufacturing the invention and in part to the method of attachment.

A further object of the present invention is to provide an improved document easel that is easily reoriented.

Still another object of the present invention is to provide an improved document easel capable of supporting a number of documents, notes and the like. The weight of the documents supported can be up to a few pounds.

SUMMARY OF THE INVENTION

To accomplish these and other objects of this invention there is provided an improved easel for supporting documents, books, notes and the like, including support means for supporting documents, books, notes and the like. The support means is operatively associated with an easel receiving device. The document supporting easel provides means for propping the documents in a generally upright, yet inclined and easily readable position or attitude. The improved easel includes a support member and the support member has a base portion which is adapted for attachment to a generally vertical surface of the easel receiving device. The support member further includes a plurality of extension means associated with the base portion.

An axis of rotation will be defined by the base portion such that the axis of rotation is generally perpendicular to the base portion. Another axis of rotation will also be defined by the base portion such that the other axis of rotation is generally parallel to the base portion. The easel of the present invention further includes another support member. This other support member also has a base portion which is generally adapted for attachment to a generally horizontal surface of the easel receiving device. This other support member also includes an extension means.

Conecting the two support members is accomplished with attachment means for operatively connecting the two support members in a manner such that the attachment means allows relative motion between the two support members about the one axis, that is, the axis generally perpendicular to the base portion of the one support member. Another attachment means operatively connects the one support member and the document support means. This other attachment means provides for and allows a selective relative rotational motion between the one support member and the document support means about the other axis, that is, the axis generally parallel to the base portion of the one support member.

These and other objects and features of the present invention will be better understood and appreciated from the following detailed description of one embodiment thereof, selected for purposes of illustration and shown in the accompanying drawings.

BRIEF DESCRIPTION OF THE DRAWINGS

FIG. 1 is a perspective view of an easel constructed in accordance with the present invention;

FIG. 2 is an elevation view of the easel in FIG. 1;

DETAILED DESCRIPTION

Figure 3:
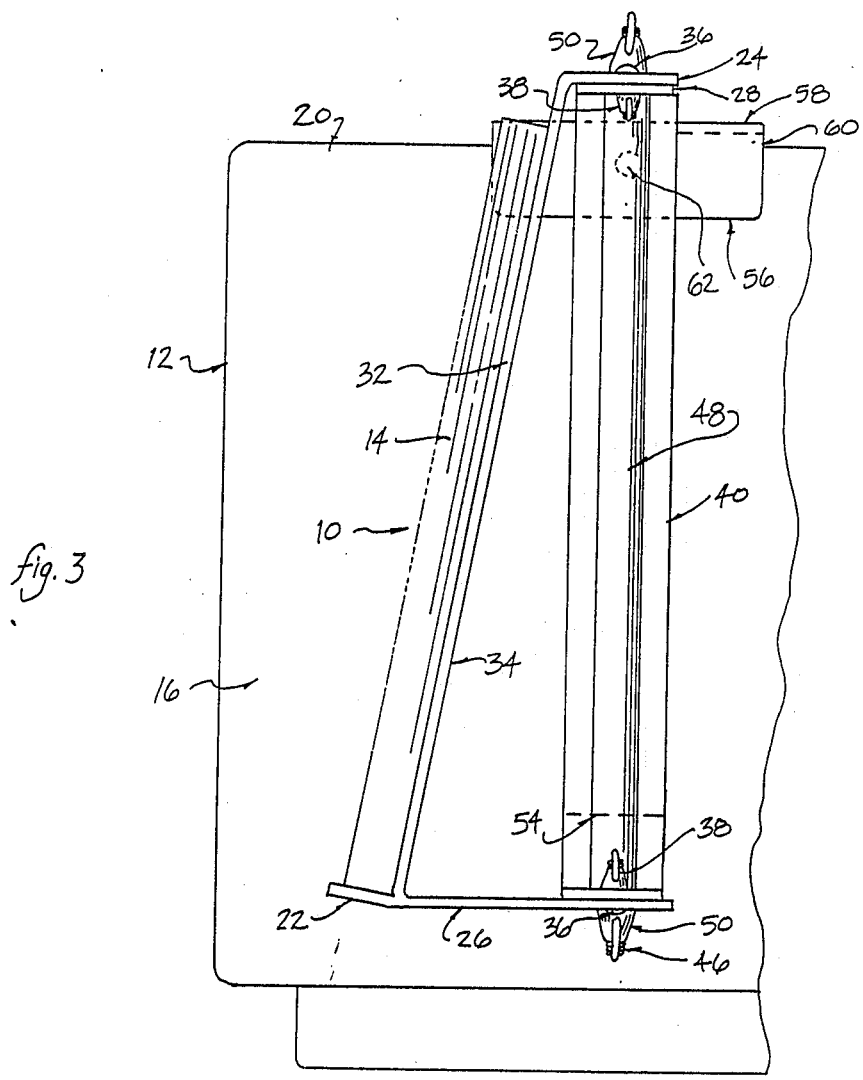
FIG. 3 is an elevation view of the easel illustrated in FIG. 1 taken along line 3—3 in FIG. 2.

Referring now to the drawings there is shown a preferred embodiment of the document easel of this invention. The document easel is described in connection with a video display terminal. The document easel of the present invention is particularly adapted for providing a document support that props documents in a generally upright, yet inclined and easily readable position or attitude. The document easel accomplishes this by providing a generally planar document prop or support and a supporting extension means such as a lip extending outwardly from the generally planar prop means as illustrated and described for supporting a document 14 or the like on the document easel.

The drawings show a document easel 10 providing document support and document propping means in conjunction with a video display terminal 12. It will be understood from the description of one preferred embodiment for use in conjunction with the video display terminal, that other devices will be suitable for receiving the document easel. It is anticipated that the document easel of the present invention also can be used, for example, in conjunction with other keyboard devices that are large enough or have large enough housings to receive the present invention in a fashion similar to that described herein for the video display terminal.

The video disply terminal ("VDT") user very often must refer to books, documents, notes or the like generally indicated by reference character 14, in order to accomplish a particular project or job. The VDT will usually include a generally vertical side 16 and another opposing, generally vertical side 18. The top, generally horizontal surface of the VDT is indicated by reference character 20.

The document easel or propping device 10 further includes a document support means such as a lip 22. The document support is suitable for supporting books, documents, notes, and the like. The document easel further includes an upper plate member 24 and a lower plate member 26. The upper plate member 24 is attached to one extending arm member 28. The lower plate member is attached to another extending arm member 30. The lip extends outwardly from one side 32 of the easel device 10. The upper plate member and the lower plate member both extend outwardly from an opposing side 34 of the easel device 10. A combination of bolts 36 and wing nuts 38 are used in the illustrated embodiment to attach the extending arm members 28, 30 to the respective plate members 24, 26.

The use of the disclosed fastening means, i.e., bolts 36 and wing nuts 38, or other equivalent fastening means, specifically prohibits relative motion between the plate members and their respective extension members. The plate members 24 and 26 have holes on opposing ends for receiving the fastening means for attaching the extending arm members thereto and thereby providing an arrangement for mounting the document easel on either side of the VDT by shifting the extending arm members from one set of holes to the opposing set of holes. In the illustrated embodiment there are four holes in the upper plate member and four holes in the lower plate member, each plate member having a pair of holes at opposing ends. It will be understood that the number of holes and the fastening means may vary as required for particular circumstances and use of the present invention.

A support member for attachment to one of the generally vertical sides of the VDT provides intermediate support between the VDT and the document support 22. A generally U-shaped member 40, hereinafter referred to as the U-shaped member, is provided as illustrated for a preferred embodiment and is attached to the upper plate member and the lower plate member. A plurality of extension means provide attachment means for attachment between the document support means and the VDT via a shaft member. One U-shaped member arm extension 42 and another opposing U-shaped member arm extension 44 include suitable apertures for receiving a shaft member, such as rod 46 supporting a hollow member, such as a hollow tube 48. Opposing ends of the rod 46 extend through respective arm extensions of the U-shaped member and the extending arm members so as to receive threaded wing nuts 50, or other suitable fastening members. This combination creates a tension/compression arrangement that is better understood from the cross section illustrated in FIG. 4. The hollow tube is compressed and the rod is in tension, hence the tension/compression arrangement, and friction is produced relative to the document support that results in the document support remaining in either its initial or reoriented position. It will be understood that tightening wing nuts 50, while placing a compressive force on the arm extensions 42, 44, 28 and 30 allows easel rotation about a vertical axis generally parallel to the longitudinal axis of the shaft member which is also generally parallel to the base portion of the U-shaped member.

Figure 4:
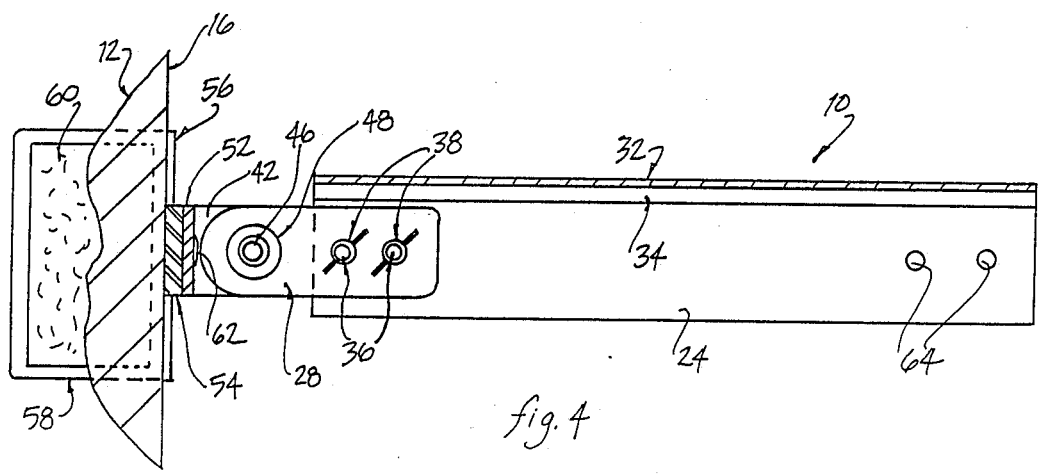
FIG. 4 is a cross section taken along line 4—4 in FIG. 2.

The wing nuts 50 need only be tightened once normally. This lack of any need to loosen and then retighten the wing nuts for each reorientation is a significant advantage over known support devices. This is accomplished in the following manner. The hollow tube 48 is located intermediate either the U-shaped member arm extensions or extending arm members depending upon the particular arrangement. Therefore, the only relative frictional motion is between the U-shaped member arm extensions and their respective extending arm members and not between the wing nuts and any adjacent members of the present invention. Referring to FIG. 4 it will be understood that the inside diameter of hollow tube 48 is greater than the outside diameter of rod 46, thereby preventing friction therebetween.

The U-shaped member of the illustrated embodiment includes a base portion or base member 52 suitable for attachment to one of the generally vertical sides of the VDT. In the illustrated embodiment an attachment means for the VDT is provided by an adhesive strip 54 located on the VDT facing surface of base member 52. Also provided to attach and stabilize the document support means on the easel receiving device is another support member illustrated in the present embodiment as an L-shaped member 56. The L-shaped member 56 has a base portion adapted for attachment to the generally horizontal top surface of the VDT and an extension member 58. In a preferred embodiment another adhesive strip 60 attaches to the VDT and a rivet 62 or other suitable, pivotable fastener or attachment means attaches the L-shaped member 56 to the base 52 of the U-shaped member 40. The pivoting fastener provides rotation about an axis generally perpendicular to the longitudinal axis of the rod 46 and hollow tube 48 or generally perpendicular to the base portion of the U-shaped member. This rotation allows the U-shaped member to be mounted vertically while the L-shaped member is mounted flat to a possibly sloping top 20 of a VDT.

One set of mounting holes 64 in the upper plate member 24 and another set of mounting holes 66 in the lower plate member cooperate with corresponding openings in respective extending arm members 28 and 30 so as to provide for further adjustment of the distance the document support means of the present invention extends away from the VDT. Additional sets of openings or holes in the extending arm members through which the upper plate member and the lower plate member are attached or fastened to their respective extending arm members 28, 30 effectively changes the sideways offset of the document easel from the side of the VDT.

In operation, in connection with the VDT application previously mentioned to support the books, documents, notes, drafts and the like of the operator of a video display terminal, the attachment means provided on the U-shaped member base 52 and the L-shaped member base 58, such as adhesive strips 54 and 60, respectively, secure the document easel 10 to the VDT 12. Thus, the document easel is initially attached to the VDT. The extending arm members 28, 30 in combination with the U-shaped member arm extensions 42, 44 and the rod 46 and hollow tube 48 allow the easel to be reoriented as desired about the longitudinal axis of the rod 46. The wing nuts 50 and the threaded ends of the rod 46 allow the easel to be pivoted while providing suficient tension so as to allow the easel to remain in the desired position after reorientation. The tension rod allows the reorientation to be performed by simply pushing or pulling the easel into the desired position where the pushing or pulling force is just enough to overcome the friction caused by the tension/compression of the rod and tube combination on the extending arm members 28 and 30 that are movably held between the wing nuts or U-shaped member arm extensions and the hollow tube. The embodiment in FIG. 1 illustrates the extending arm members intermediate the hollow tube and the U-shaped member arm extensions.

The easel is initially adjusted. The tension/compression arrangement does not require further adjustment. The tension/compression of the arrangement causes friction which is sufficient to maintain the easel's position while holding a book, notes, or the like.

Both the U-shaped member 40 and the L-shaped member 56 are made of sufficiently flexible material to conform to the side and the top of a VDT with curved sides or top.

The preferred method of attachment to the VDT is, as previously mentioned, through the use of a flexible tape with adhesive on both sides. This tape is often referred to as mounting tape. In this preferred method the U-shaped and the L-shaped attaching members can be removed and subsequently reattached to the other side of the VDT or to another VDT without damaging either the VDT or the attaching members. Although the original tape may not be reusable, new tape is readily available.

While a specific embodiment has been shown and described, many variations are possible. The specific shape of the component members may be changed as desired to suit particular mounting equipment or VDTs or to meet particular aesthetic requirements. The upper and lower extensions of the document easel represented by the upper plate member 24 and the lower plate member 26 have facing surfaces and opposing surface as clearly illustrated in the drawings. It will be understood that it is within the scope of the present invention to attach the tension/compression rod and hollow shaft arrangement such that the extending arm members 28 and 30 can be attached to either the facing surfaces or the opposing surfaces which may be desired by a user of the present invention. It will be further understood that using an attachment member of sufficient strength on the base portion of the U-shaped member provides an embodiment of the present invention in which the L-shaped member would not be needed. The extending arms could be integral with the upper and lower extensions or plates.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of the invention be determined by the appended claims and their equivalents.

What is claimed is:

1. An improved easel for supporting documents, books, notes and the like, the support means operatively associated with an easel receiving device and document support means for propping the documents in a generally upright, yet inclined and easily readable position or attitude, the improvement comprising:

a support member, the support member having a base portion adapted for attachment to a generally vertical surface of the easel receiving device, the support member having a plurality of extension means, an axis of rotation defined by the base portion such that the axis of rotation is generally perpendicular to the base portion, another axis of rotation defined by the base portion such that the other axis of rotation is generally parallel to the base portion; and an attachment means for operatively connecting the support member and the document support means, the attachment means allowing selective relative rotational motion between the support member and the document support means about the other axis, the attachment means coextensive with at least a portion of the other axis of rotation.

2. An improved easel as set forth in claim 1 wherein the easel receiving device is a video display terminal.

3. An improved easel as set forth in claim 1 wherein the support member is a generally U-shaped member.

4. An improved easel as set forth in claim 1 wherein the support member extension means include one extending arm and another extending arm, the extending arms attached to the document support means.

5. An improved easel as set forth in claim 1 wherein the attachment means comprises a hollow member, a shaft member received within the hollow member and fastening means, whereby the fastening means allow selective relative rotational motion between the one support member and the document support means about the other axis without loosening the fastening means.

6. An improved easel as set forth in claim 5 wherein the hollow member and shaft member comprise a hollow tube and a rod received within the tube.

7. An improved easel as set forth in claim 5 wherein the fastening means comprise opposing wing nuts threadably received by opposing ends of the shaft member, thereby providing for adjusting the friction between the one support member an the document support means by adjusting the tightness of at least one of the wing nuts.

8. An improved easel as set forth in claim 1 further comprising:

another support member, the other support member having another base portion adapted for attachment to a generally horizontal surface of the easel receiving device, the other support member having another extension means; and and another attachment means for operatively connecting the one support member and the other support member, the attachment means allowing relative motion about the one axis.

9. An improved easel as set forth in claim 8 wherein the other support member is a generally L-shaped member having a base portion and an extension member, the extension member attached to the one support member, thereby allowing relative motion between the support member and the L-shaped member about the one axis.

10. An improved easel as set forth in claim 8 wherein the attachment means is a rivet.

11. An improved easel as set forth in claim 1 wherein the document support means is a document easel having a propping means, an upper extension means and a lower extension means extending outwardly from the document easel, the upper and lower extension means operatively connected to the other attachment means.

12. An improved easel as set forth in claim 11 wherein the extension means include one extending arm and another extending arm, the extending arms integral with their respective document easel upper and lower extensions.

13. An improved easel as set forth in claim 11 wherein the document easel comprises a generally planar document prop means inclined at an attitude for supporting the documents at a generally easy to read attitude, and a lip extending outwardly from the generally planar prop means for further supporting the document on the document easel.

14. An improved easel as set forth in claim 11 wherein the upper and lower extension means are an upper plate and a spaced apart lower plate.

15. An improved easel as set forth in claim 14 wherein the upper and lower extension means of the document easel have facing surfaces and opposing surfaces and the support member extending arms are attached to the facing surfaces of the document easel upper and lower extension means.

16. An improved easel as set forth in claim 14 wherein the upper and lower extension means of the document easel have facing surfaces and opposing surfaces and the support member extending arms are attached to the opposing surfaces of the document easel upper and lower extensions means.

17. An improved easel as set forth in claim in 14 wherein the extension means include adjustment means for various positioning of the one support member on the means for supporting the documents.

18. An improved easel as set forth in claim 14 wherein the extension means include one extending arm and another extending arm, the extending arms attached to the upper and lower extensions of the document easel.

19. An improved easel as set forth in claim 18 wherein the extension means include adjustment means for various positioning the one support member on the means for supporting the documents.

20. An improved easel as set forth in claim 18 wherein the upper and lower extension means of the document easel have facing surfaces and opposing surfaces and the support member extending arms are attached to the facing surfaces of the document easel upper and lower extension means.

21. An improved easel as set forth in claim 18 wherein the upper and lower extension means of the document easel have facing surfaces and opposing surfaces and the support member extending arms are attached to the opposing surfaces of the document easel upper and lower extension means.

22. An improved easel for supporting documents, books, notes and the like, the support means operatively associated with an easel receiving device and document support means for propping the documents in a generally upright, yet inclined and easily readable position or attitude, the improvement comprising:

a support member including a generally U-shaped member, the U-shaped member having a base portion adapted for attachment to a generally vertical surface of the easel receiving device, the support member having a plurality of extension means including one extending arm and another extending arm, the extending arms attached to the document support means, an axis of rotation defined by the base portion such that the axis of rotation is generally perpendicular to the base portion of the U-shaped member, another axis of rotation defined by the base portion such that the other axis of rotation is generally parallel to the base portion; and an attachment means for operatively connecting the one support member and the document support means, the one attachment means allowing selective relative rotational motion between the one support member and the document support means about the other axis, the attachment means coextensive with at least a portion of the other axis of rotation.

23. An improved easel as set forth in claim 22 wherein the easel receiving device is a video display terminal.

24. An improved easel as set forth in claim 22 wherein the fastening means comprise opposing wing nuts threadably received by opposing ends of the shaft member, thereby providing for adjusting the friction between the one support member and the document support means by adjusting the tightness of at least one of the wing nuts.

25. An improved easel as set forth in claim 22 further comprising:

another support member, the other support member including a generally L-shaped member having a base portion and an extension member, the extension member attached generally perpendicularly to the base portion of the L-shaped member, the extension member further attached to the base portion of the generally U-shaped member so as to allow relative motion between the U-shaped member and the L-shaped member about the one axis, the L-shaped member base portion adapted for attachment to a generally horizontal surface of the easel receiving device; and attachment means for operatively connecting the one support member and the other support member, the attachment means allowing relative motion about the one axis.

26. An improved easel as set forth in claim 22 wherein the hollow member and shaft member comprise a hollow tube and a rod received within the tube.

27. An improved easel as set forth in claim 22 wherein the document support means is a document easel having a propping member, an upper extension and a lower extension extending outwardly from the document easel, the upper and lower extensions operatively connected to the other attachment means.

28. An improved easel as set forth in claim 27 wherein the attachment means is a rivet.

29. An improved easel as set forth in claim 27 wherein the upper and lower extensions include adjustment means for various positioning of the support member on the document support means.

30. An improved easel as set forth in claim 27 wherein the document easel comprises a generally planar document prop means inclined at an attitude for supporting the documents at a generally easy to read attitude, and a lip extending outwardly from the generally planar prop means for further supporting the document on the document easel.

31. An improved easel as set forth in claim 27 wherein the upper and lower extensions are an upper plate and a spaced apart lower plate.

32. An improved easel as set forth in claim 27 wherein the upper and lower plates of the document easel have facing surfaces and opposing surfaces and the extending arms of the generally U-shaped member are attached to the facing surfaces of the document easel upper and lower plates.

33. An improved easel as set forth in claim 31 wherein the upper and lower plates of the document easel have facing surfaces and opposing surfaces and the extending arms of the generally U-shaped member are attached to the opposing surfaces of the document easel upper and lower plates.

34. An improved easel for supporting documents, books, notes and the like, including a document propping member for propping the documents in a generally upright, yet inclined and easily readable position or attitude, the easel operatively associated with a video display terminal, the improvement comprising:

a generally U-shaped member, the U-shaped member having a base portion adapted for attachment to a generally vertical surface of the video display terminal, the U-shaped member including an upper extension arm and a lower extension arm, the extension arms attached to the easel, an axis of rotation defined by the base portion such that the axis of rotation is generally perpendicular to the base portion of the U-shaped member, another axis of rotation defined by the base portion such that the other axis of rotation is generally parallel to the base portion; and a hollow member and a shaft member, the hollow member receiving the shaft member, the hollow member and the shaft member extending between the upper extension arm and the lower extension arm of the generally U-shaped member, the easel including upper and lower extensions, and the combination hollow member and shaft member attached to the upper extension arm, the lower extension arm, the easel lower extension and the easel upper extension operatively connected by fastening means, whereby the fastening means allow selective relative rotational motion between the generally U-shaped member and the easel about the other axis without loosening the fastening means, that is the axis generally parallel to the base portion of the generally U-shaped member.

35. An improved easel as set forth in claim 34 further comprising:

a generally L-shaped member having a base portion and an extension member, the extension member extending generally perpendicularly to the base portion of the L-shaped member, the extension member further attached to the base portion of the generally U-shaped member so as to allow relative motion between the U-shaped member and the L-shaped member about the one axis, the L-shaped member base portion adapted for attachment to a top surface of the video display terminal.

36. An improved easel as set forth in claim 35 wherein the easel includes upper and lower plates, the upper and lower plates of the easel have facing surfaces and opposing surfaces and the upper and lower extension arms of the generally U-shaped member are attached to the opposing surfaces of the document easel upper and lower plates.

37. An improved easel as set forth in claim 35 wherein the generally U-shaped and generally L-shaped members are operatively connected by a rivet, whereby the these members are allowed to rotate with respect to each other about the one axis, that is the axis generally perpendicular to the U-shaped member base portion.

38. An improved easel as set forth in claim 35 wherein the fastening means comprise opposing wing nuts threadably received by opposing ends of the shaft member, thereby providing for adjusting the friction between the one support member and the document support means by adjusting the tightness of at least one of the wing nuts.

39. An improved easel as set forth in claim 35 wherein the easel includes upper and lower plates, the upper and lower plates of the easel have facing surfaces and opposing surfaces and the upper and lower extension arms of the generally U-shaped member are attached to the facing surfaces of the document easel upper and lower plates.

40. An improved easel as set forth in claim 39 wherein the lower plate and the upper plate include adjustment means for various positioning of the generally U-shaped member on the document support means.

* * * * *